United States Patent
Kumar

(10) Patent No.: US 11,803,581 B2
(45) Date of Patent: Oct. 31, 2023

(54) SYSTEM FOR IDENTIFYING AND LINKING ENTITY RELATIONSHIPS IN DOCUMENTS

(71) Applicant: Infrrd Inc, San Jose, CA (US)

(72) Inventor: Deepak Kumar, Bengaluru (IN)

(73) Assignee: INFRRD INC, San Jose, CA (US)

( * ) Notice: Subject to any disclaimer, the term of this patent is extended or adjusted under 35 U.S.C. 154(b) by 246 days.

(21) Appl. No.: 17/327,780

(22) Filed: May 24, 2021

(65) Prior Publication Data
US 2021/0279459 A1    Sep. 9, 2021

(51) Int. Cl.
| G06F 16/33 | (2019.01) |
| G06N 3/02 | (2006.01) |
| G06V 30/412 | (2022.01) |
| G06V 10/25 | (2022.01) |
| G06V 30/19 | (2022.01) |
| G06V 10/82 | (2022.01) |

(52) U.S. Cl.
CPC ........... *G06F 16/3347* (2019.01); *G06N 3/02* (2013.01); *G06V 10/25* (2022.01); *G06V 10/82* (2022.01); *G06V 30/19173* (2022.01); *G06V 30/412* (2022.01)

(58) Field of Classification Search
None
See application file for complete search history.

(56) References Cited

U.S. PATENT DOCUMENTS

| 5,982,933 | A * | 11/1999 | Yoshii | G06F 18/24323 |
| | | | | 382/226 |
| 7,702,618 | B1 * | 4/2010 | Patterson | G06F 16/219 |
| | | | | 707/999.003 |
| 2003/0086127 | A1 * | 5/2003 | Ito | G06K 15/1852 |
| | | | | 358/462 |
| 2005/0271296 | A1 * | 12/2005 | Tsuji | H04N 1/00681 |
| | | | | 382/289 |
| 2008/0240618 | A1 * | 10/2008 | Chen | G06V 10/44 |
| | | | | 382/305 |
| 2017/0351914 | A1 * | 12/2017 | Zavalishin | G06V 10/50 |
| 2018/0107641 | A1 * | 4/2018 | Choi | G06Q 30/0276 |
| 2019/0129888 | A1 * | 5/2019 | Bowman | G06F 3/0604 |
| 2020/0019632 | A1 * | 1/2020 | Larchev | G06F 16/242 |

(Continued)

OTHER PUBLICATIONS

Sugiyama, Kazunari, and Min-Yen Kan. "A comprehensive evaluation of scholarly paper recommendation using potential citation papers." International Journal on Digital Libraries 16.2 (2015): 91-109. (Year: 2015).*

(Continued)

*Primary Examiner* — Michelle M Entezari

(57) ABSTRACT

The present invention discloses a system for linking first type of entities and second type of entities in a page. The system is configured to generate a feature vector for each of the first type of entities and each of the second type of entities. Further, the system is configured to receive into a neural network, a pair of the feature vectors, wherein one of the pair of the feature vector corresponds to a feature vector of a first type of entity and another feature vector corresponds to a feature vector of a second type of entity. The entities corresponding to the pair of feature vectors are neighboring each other. The neural network is configured to generate an output, indicating the likelihood of the pair of entities being linked.

12 Claims, 17 Drawing Sheets

(56) References Cited

U.S. PATENT DOCUMENTS

| | | | | |
|---|---|---|---|---|
| 2020/0311110 A1* | 10/2020 | Walker | ............... | G06N 3/08 |
| 2020/0358796 A1* | 11/2020 | Kundu | ............... | G06N 3/084 |
| 2020/0410320 A1* | 12/2020 | Almazán | ............... | G06N 3/084 |
| 2021/0200945 A1* | 7/2021 | Cheong | ............... | G06F 40/30 |
| 2021/0241497 A1* | 8/2021 | Agrawal | ............... | G06N 3/088 |
| 2022/0253715 A1* | 8/2022 | Ray | ............... | G06N 3/047 |
| 2022/0319143 A1* | 10/2022 | Wyle | ............... | G06V 30/41 |

OTHER PUBLICATIONS

Boughrara, Hayet, et al. "Face recognition based on perceived facial images and multilayer perceptron neural network using constructive training algorithm." IET computer vision 8.6 (2014): 729-739. (Year: 2014).*

Shi, Cheng, and Chi-Man Pun. "Multi-scale hierarchical recurrent neural networks for hyperspectral image classification." Neurocomputing 294 (2018): 82-93. (Year: 2018).*

* cited by examiner

SYSTEM FOR IDENTIFYING AND LINKING ENTITY RELATIONSHIPS IN DOCUMENTS

FIELD OF INVENTION

The subject matter in general relates to the field of document handling using image processing. More particularly, but not exclusively, the subject matter relates to a system to link entities of a document represented in a page of the document.

BACKGROUND

Every year people across the world disclose important information containing various information data of the individuals in different documents like application forms, grocery receipts, shopping bills or invoices of any purchased products or paid services, etc. The information data of the individuals may be used in different categories of data mining applications. The data mining applications may cater to various industries like marketing, recruiting, tourism, healthcare, etc. With the increasing use of data mining across industries in diverse fields, there is demand for highspeed retrieval of relevant data from the documents. There is an increasing need to retrieve relevant data by identifying each data information as a set of relatable entities with the relationships established using neural networks.

To address the above, engineers have come up with various ways of establishing relationship between entities to enhance the speed of recognising the relevant data corresponding to the details of the individuals or organizations. For example, a single-entity-single-relation question answering system is used to establish relationship between entities, wherein the question and its corresponding answer are recognized as separate entities and a relation is established between them using deep learning processes. Similarly, the visual attributes of each entity are extracted from forms and is used to establish relationship between the entities by identifying the contextual relationships between each of the plurality of entities. The contextual relationships include location, font type, size, number of characters and the type of user interface of each entity.

However, the current systems are not configured to process thousands of documents based on the relationship between multiple features of entities and hence lack in accuracy.

In view of the foregoing discussion, there is a need for a system for identifying relationship between the entities in any given document and linking the entities based on multiple feature vectors and the relationship between them. Further, there is a need to plot a summary of the document based on the relationship established between the entities.

SUMMARY

In an embodiment, the system for linking entities of a first type and a second type comprised in a page is disclosed. The system comprises one or more processors configured to generate a feature vector for each entity of the first type and each entity of the second type. The system further comprises a neural network for receiving the feature vectors of a pair of entities, wherein the pair comprises the feature vectors of a first type of entity and the feature vector of a second type of entity. Further, the neural network is configured to generate an output indicating the likelihood of the pair of first type of entity and the second type of entity being linked to each other.

BRIEF DESCRIPTION OF DIAGRAMS

Exemplary embodiments of the present invention will be understood and appreciated more fully from the following detailed description, taken in conjunction with the drawings in which, FIG. 1 illustrates a block diagram illustrating an entity linking system 100.

DETAILED DESCRIPTION OF THE INVENTION

The following detailed description includes references to the accompanying drawings, which form part of the detailed description. The drawings show illustrations in accordance with example embodiments. The numerals in the figure represent like elements throughout the several views, exemplary embodiments of the present disclosure are described. For convenience, only some elements of the same group may be labelled with numerals. The purpose of the drawings is to describe exemplary embodiments and not for production. Therefore, features shown in the figures are chosen for convenience and clarity of presentation only. Further, the figures were drawn out of scale. Moreover, the language used in this disclosure has been principally selected for readability and instructional purposes, and may not have been selected to delineate or circumscribe the inventive subject matter, resort to the claims being necessary to determine such inventive subject matter. These example embodiments are described in enough details to enable those skilled in the art to practice the present subject matter. However, it will be apparent to one of ordinary skill in the art that the present invention may be practiced without these specific details. The embodiments can be combined, other embodiments can be utilized, or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or," such that "a or b" includes "a but not b," "b but not a," and "a and b," unless otherwise indicated.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
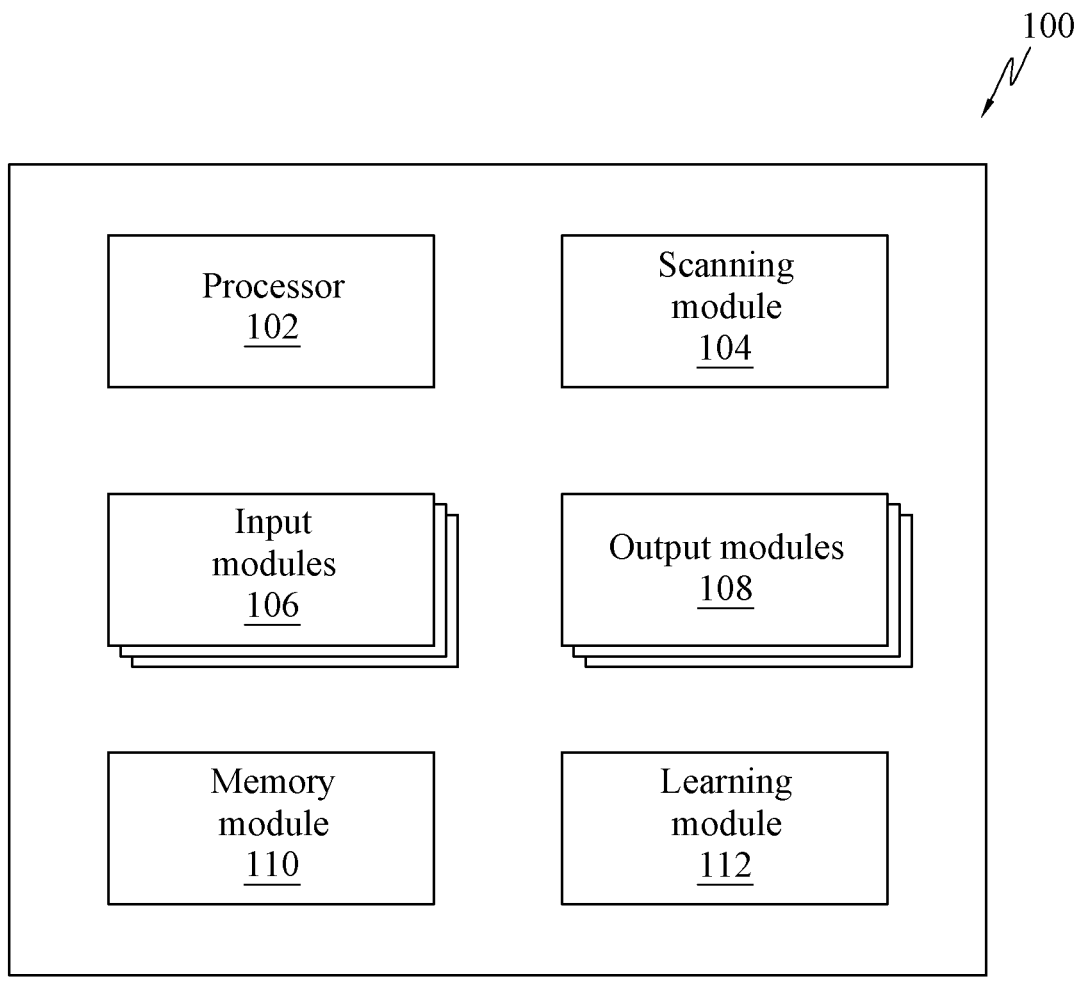

FIG. 1 illustrates a block diagram illustrating an entity linking system 100. The system 100 may comprise one or more processors 102, a scanning module 104, input modules 106, output modules 108, a memory module 110 and a learning module 112.

The processor 102 may be implemented in the form of one or more processors and may be implemented as appropriate in hardware, computer-executable instructions, firmware, or combinations thereof. Computer-executable instruction or firmware implementations of the processor 102 may include computer-executable or machine-executable instructions written in any suitable programming language to perform the various functions described.

The scanning module 104 may be configured to scan a document and further convert it into a computer-readable format.

The input modules 106 may provide an interface for input devices such as keypad, touch screen, mouse and stylus among other input devices. In an embodiment, the input modules 106 includes a camera and a microphone.

The output modules 108 may provide an interface for output devices such as display screen, speakers, printer and haptic feedback devices, among other output devices.

The memory module 110 may include a permanent memory such as hard disk drive, may be configured to store data, and executable program instructions that are implemented by the processor 102. The memory module 110 may be implemented in the form of a primary and a secondary memory. The memory module 110 may store additional data and program instructions that are loadable and executable on the processor 102, as well as data generated during the execution of these programs. Further, the memory module 110 may be volatile memory, such as random-access memory and/or a disk drive, or non-volatile memory. The memory module 110 may comprise of removable memory such as a Compact Flash card, Memory Stick, Smart Media, Multimedia Card, Secure Digital memory, or any other memory storage that exists currently or may exist in the future.

The learning module 112 may comprise deep-learning neural networks that may be configured to receive a training data and process the received input based on the training data.

Figure 2:
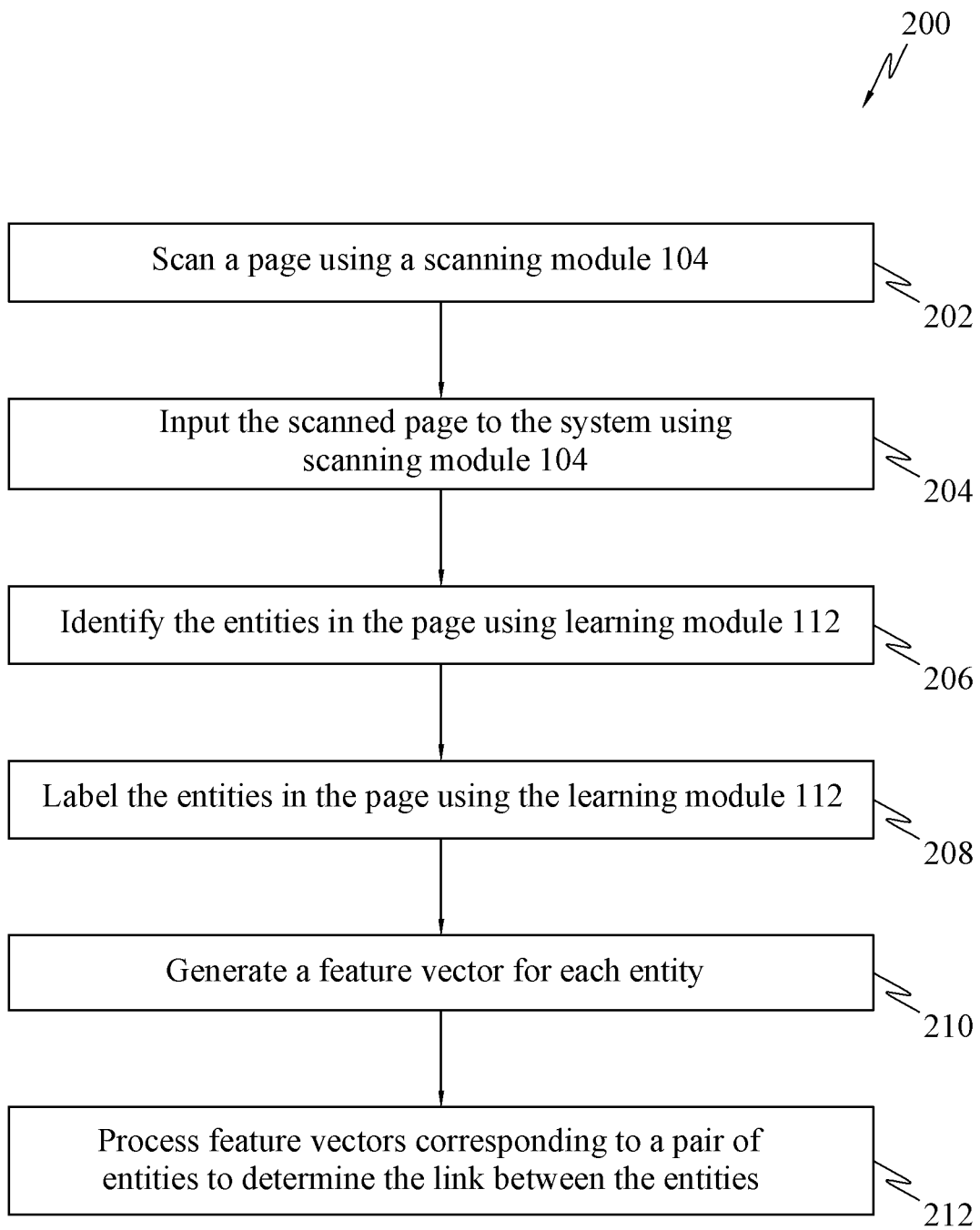
FIG. 2 is a flowchart 200 depicting a method of linking a pair of entities.
Figure 3:
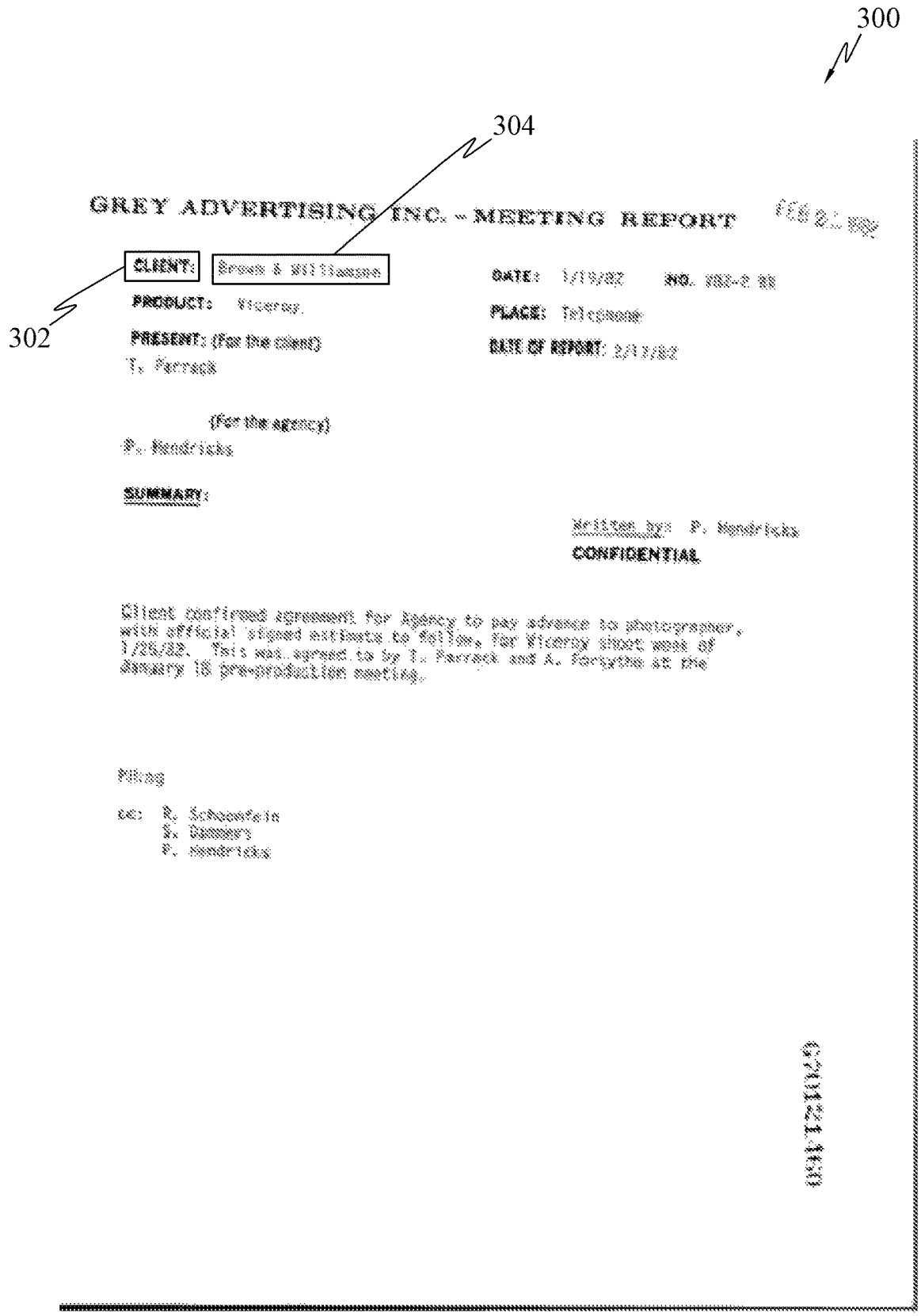
FIG. 3 is an example of a page 300 comprising the various entities that need to be linked using the entity linking system.

FIG. 2 is a flowchart 200 depicting a method of linking a pair of entities. Referring to FIG. 2, at steps 202 and 204, the scanning module 104 may scan a document that may comprise multiple pages and input the scanned document using the input module 106. The scanning module 104 may be further configured to present the multiple entities that are present in the multiple pages of the document in a single page 300. For example, as shown in FIG. 3, the scanning module 104 may be configured to generate a page 300 comprising the plurality of entities of the page. The page 300 may be generated in an image format.

At step 206, the learning module 112 may be configured to identify the plurality of entities of the page 300. Further, at step 208, the learning module 112 may be configured to label the various types of entities of the page 300. For example, as shown in FIG. 3, the learning module 112 may be configured to identify a first type of entity and label the first type of entity as a head entity 302 and identify a second type of entity and label the second type of entity as a tail entity 304. Further, the learning module 112 may be configured to identify entities that are neither a first type of entity nor a second type of entity and label them accordingly.

The head entity 302 may be similar for a set of similar documents. For example, the set of similar documents may be a set of invoices, or a set of application forms, or a set of receipts, etc. One of the head entities 302 in a set of invoice may be "Client" or "Date", etc., as illustrated in FIG. 3.

The tail entity 304 may be unique to each document in the set of similar documents. For example, the tail entity 304 in the set of invoices may be the actual name of each client, or the actual date of each invoice, etc., as shown in FIG. 3.

At step 210, a feature vector may be generated for each of the head entity and the tail entity.

Figure 4:
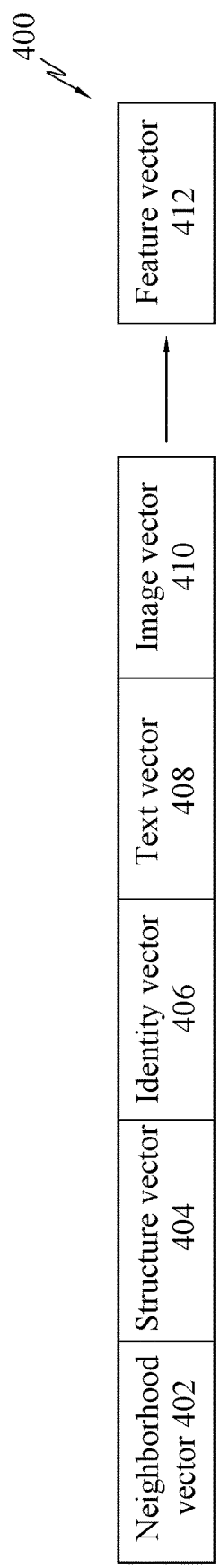
FIG. 4 illustrates a feature vector 400 of an entity.

The feature vector 412 (refer FIG. 4) of each entity may be formed by concatenating a neighborhood vector 402, a structure vector 404, an identity vector 406, a text vector 408 and an image vector 410 of each of the entity that may be either the head entity or the tail entity of the page. The structure vector 404 may be similar for a document of identical type.

At step 212, the one or more processors 102 may be configured to determine the link between each pair of a head entity and a neighboring tail entity.

Figure 5:
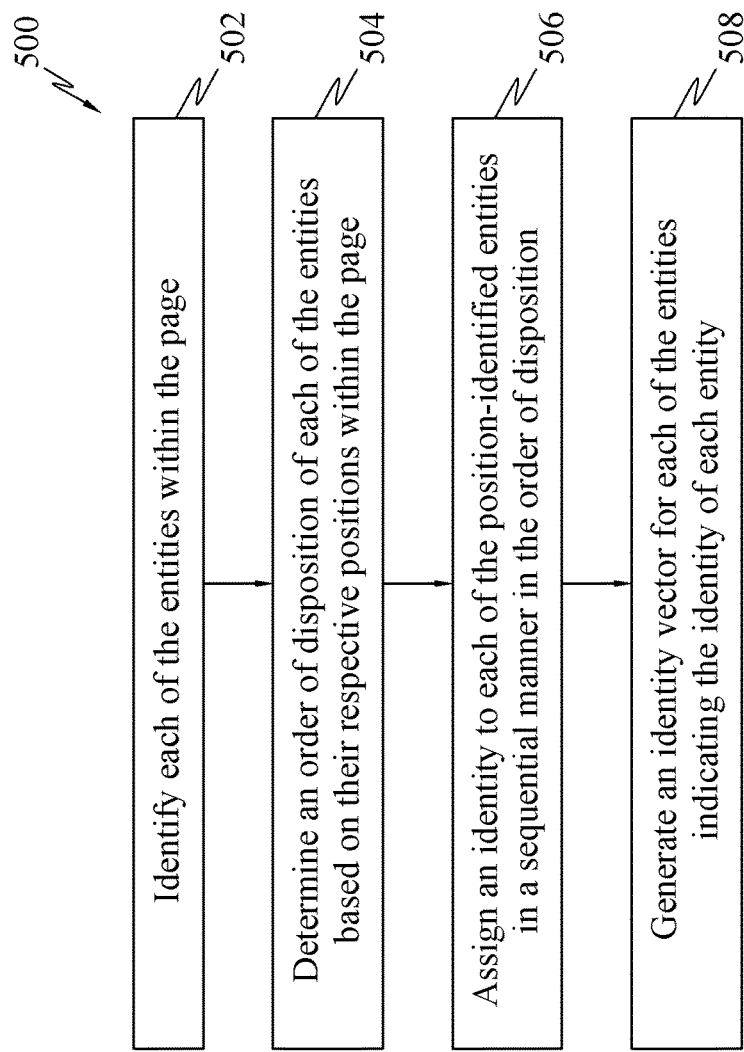
FIG. 5 is a flowchart 500 of a method of generating an identity vector for an entity.

FIG. 5 is a flowchart 500 of a method of generating an identity vector for an entity. At step 502, the one or more processors 102 may be configured to identify each entity in the page.

At step 504, the one or more processors 102 may determine an order of disposition of each of the entities based on their respective positions in the page.

At step 506, the one or more processors 102 may be configured to assign an identity for each of the position-identified entities in a sequential manner according to the order of disposition.

At step 508, the one or more processors 102 may be configured to generate the identity vector 406 for each entity indicating the identity of the entity.

Figure 6:
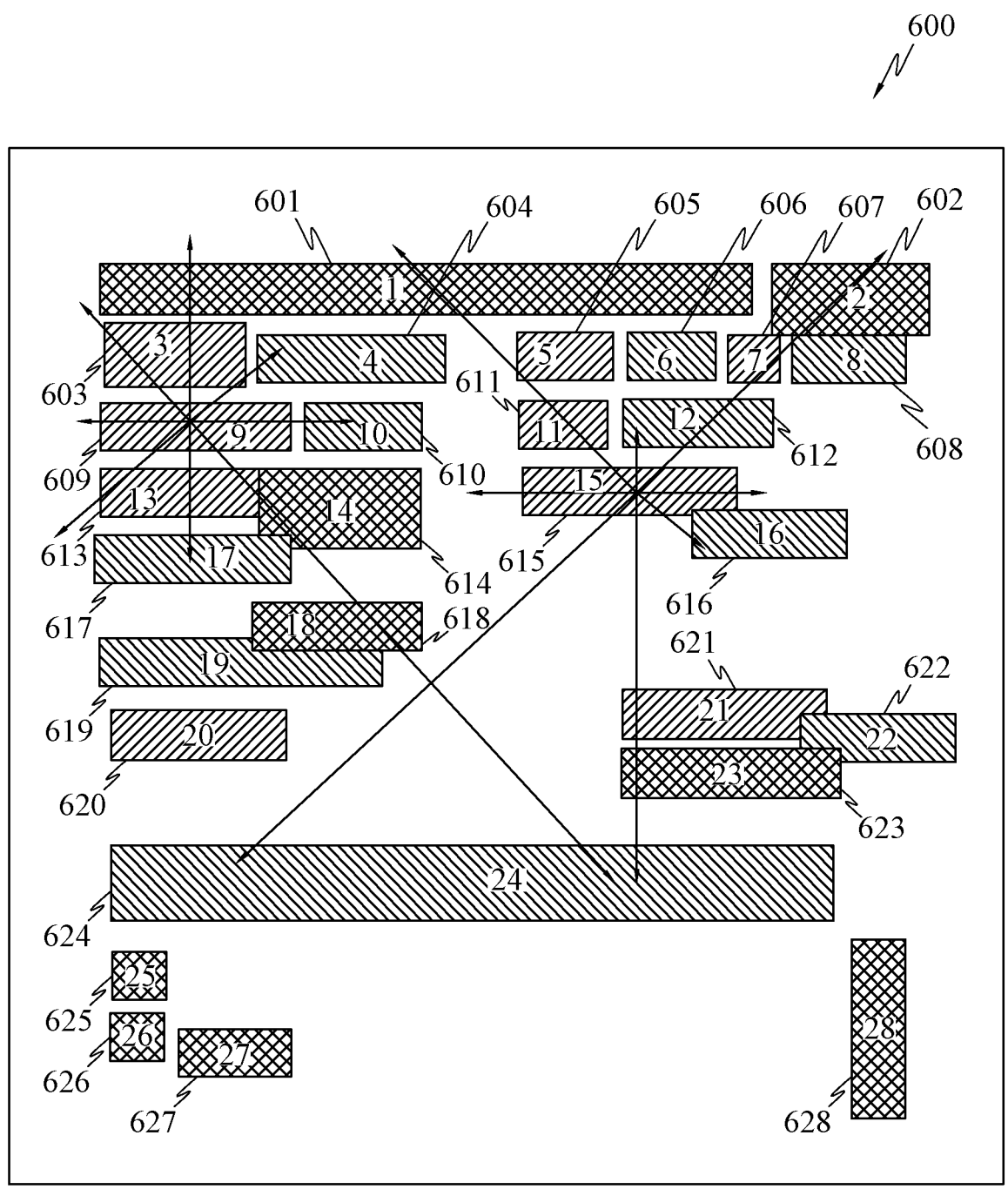
FIG. 6 illustrates a page 600 comprising entities that are assigned an identity.

FIG. 6 illustrates a page 600 comprising entities that are assigned an identity. Referring to FIG. 6, the entities may be sequentially numbered from 1 to 28 corresponding to the order of the disposition of each entity in left-to-right (LTR) and top-to-bottom (TTB) order.

In an embodiment, an identity vector for each of the entity may be generated by normalizing the position of the entity with respect to the total number of entities in the page. For example, the identity vector of the entity numbered 9 as shown in 609 in the page 600 may be obtained by normalizing the position of the entity 9 with respect to the total number of entities 28 in the page. Therefore, the identity vector may be a one element vector with value 9/28.

Figure 7A:
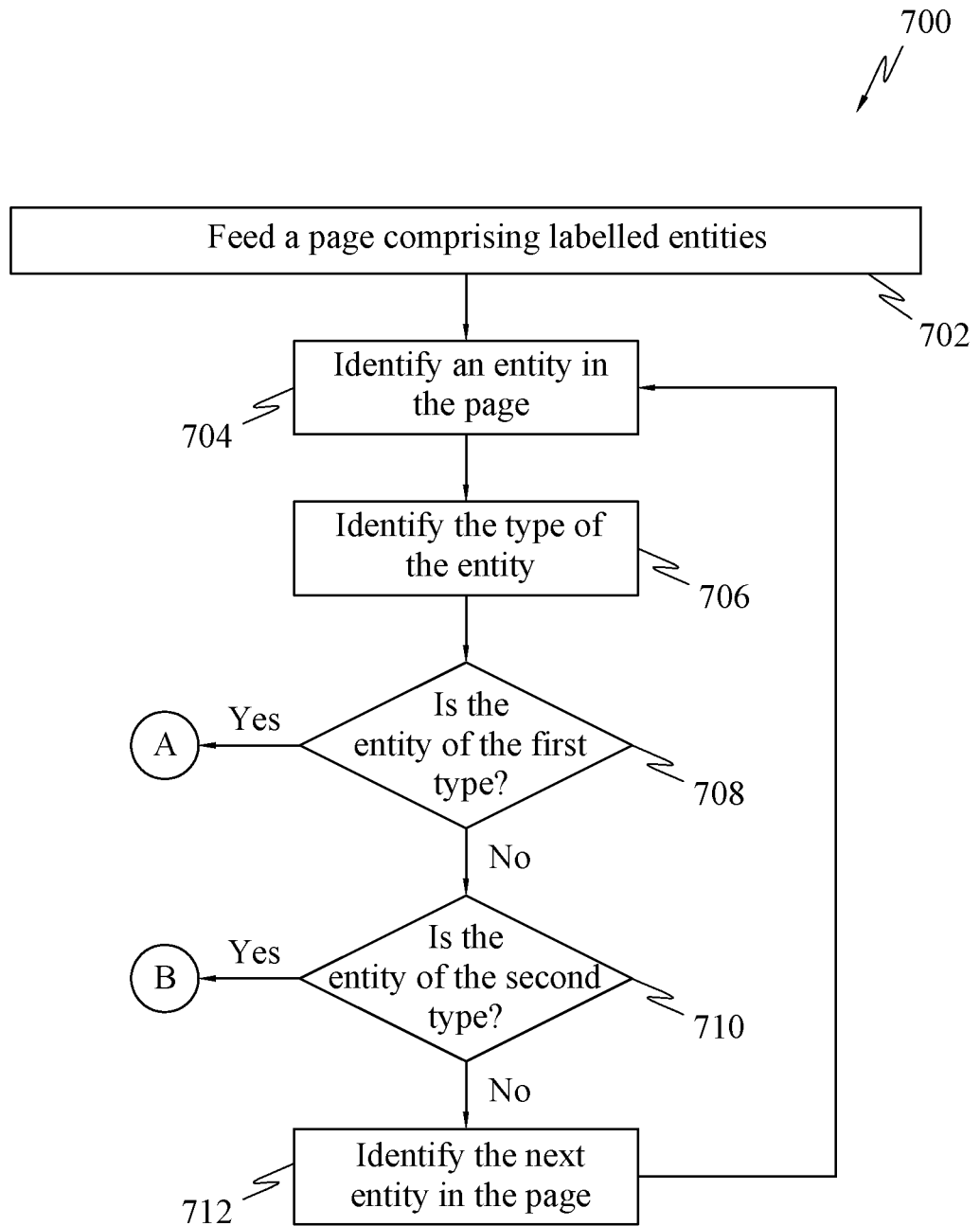
FIGS. 7A, 7B and 7C is a flowchart 700 of a method of generating a neighborhood vector for an entity.
Figure 7B:
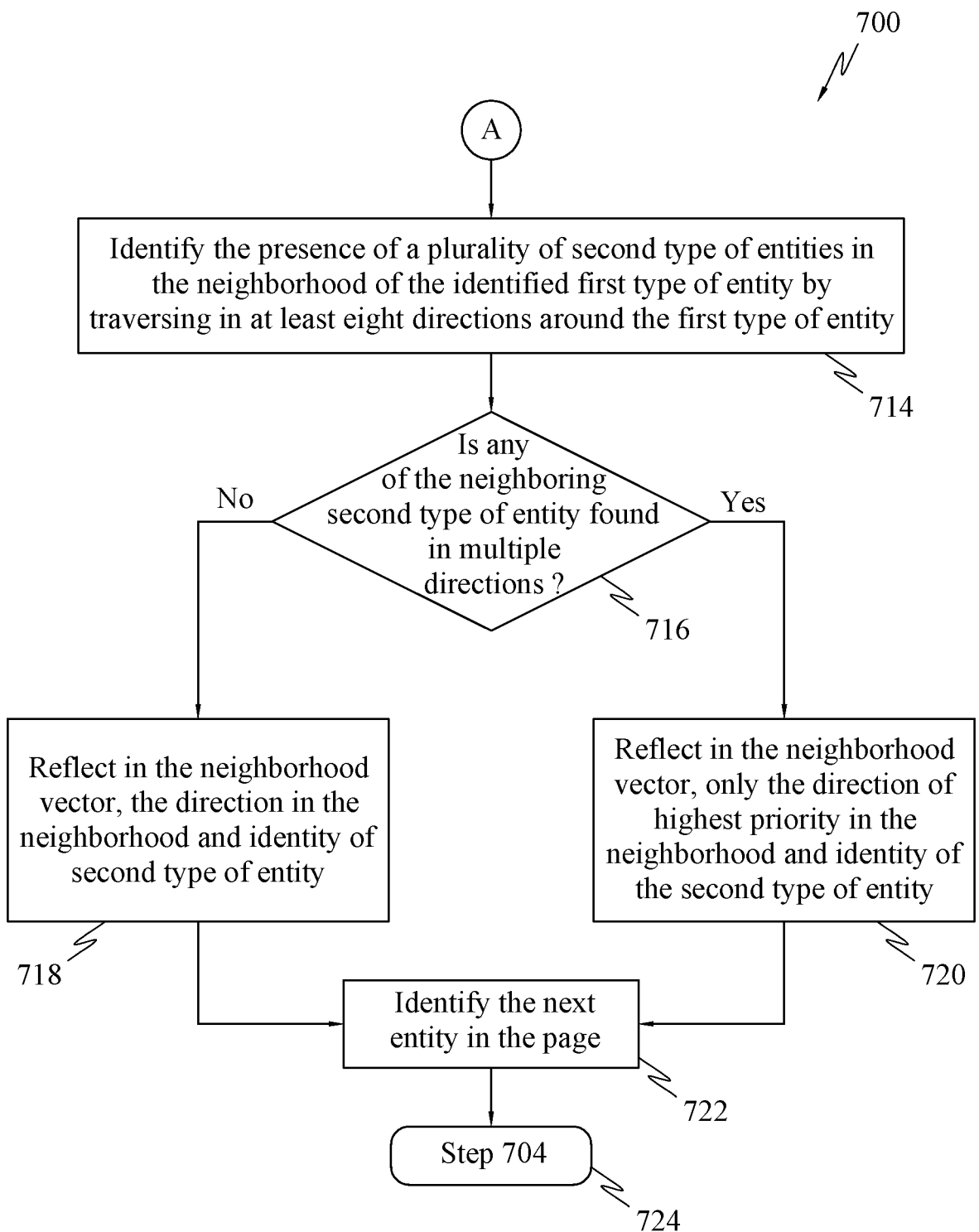
Figure 7C:
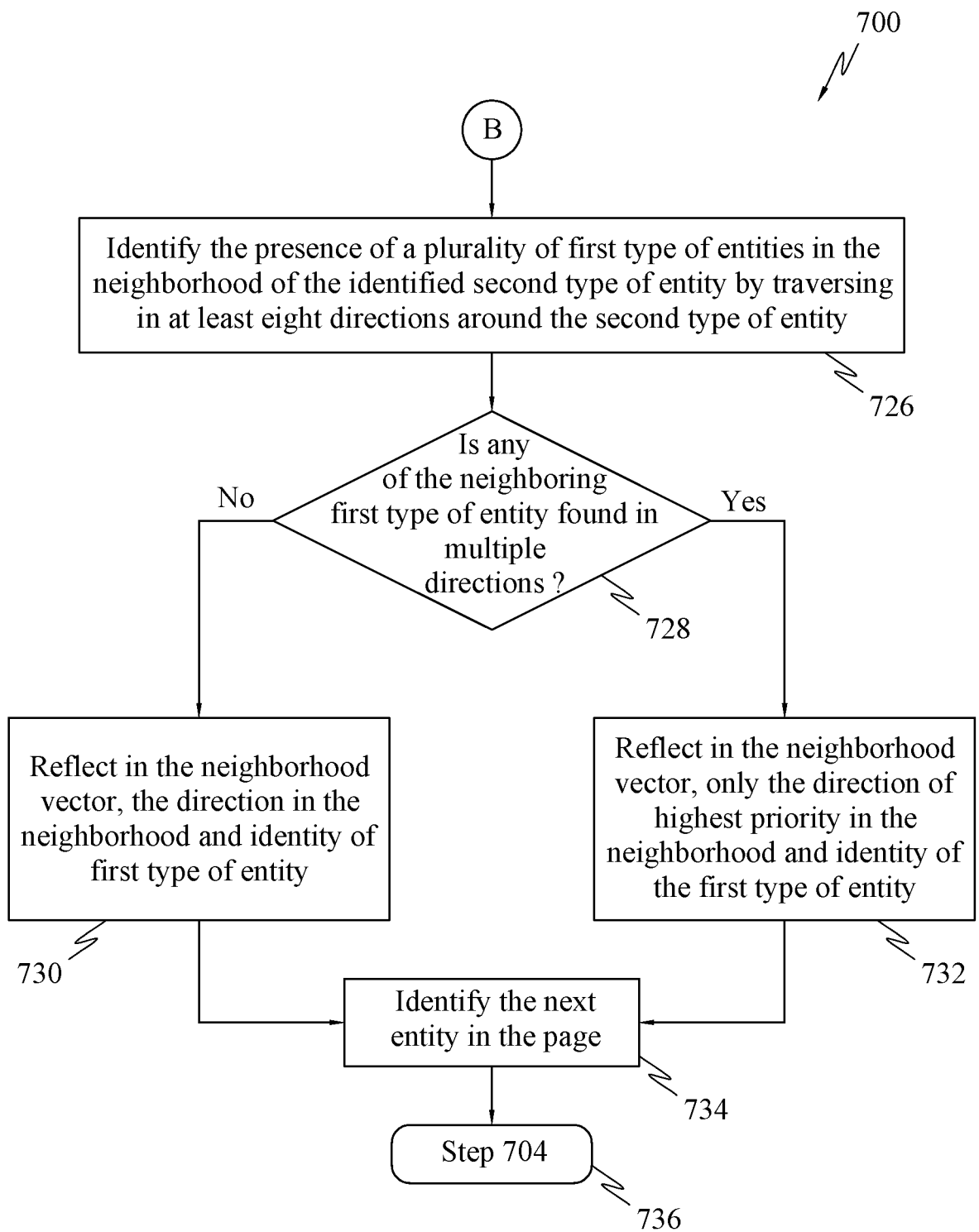

FIGS. 7A, 7B and 7C is a flowchart depicting the method of generating a neighborhood vector 402 for each of the entities (head entity and tail entity).

Referring to FIG. 7A, at step 702, a page comprising the entities labelled according to the type of the entity (a head entity, a tail entity or an entity that is neither a head entity nor a tail entity) along with their respective identities is fed into the system 100.

At step 704, the processor may identify an entity of the page. As an example, the entity may be the entity with an identity value 1 (601 in FIG. 6).

At step 706, the processor 102 may determine the type of the identified entity. If the identified entity is neither a head entity nor a tail entity, then at step 712, the processor may be moved onto identifying the next entity in the page.

At step 708, the processor 102 may determine whether the type of entity determined in step 706 is a head entity.

If yes, then at step 714, the one or more processors 102 may be configured to identify the presence of a plurality of tail entities neighboring the head entity by traversing in at least eight directions around the head entity.

In one embodiment, the one or more processors 102 may be configured to set a threshold for traversing in each direction. As an example, for a head entity, the threshold may be based on identifying a first tail entity in each direction.

At step 716, the processor 102 may be configured to check whether any of the tail entities neighboring the head entity is identified in multiple directions.

If no, then at step 718, the processor 102 may reflect in the neighborhood vector, the direction of the identified tail entity and the identity of the tail entity.

If yes, then at step 720, the processor 102 may reflect in the neighborhood vector 402, the direction having the highest priority in the neighborhood and the identity of the corresponding tail entity.

To explain it further, referring to FIG. 6, consider identifying the neighboring tail entities of a head entity 615 with an identity 15 on page 600. The neighboring tail entities may be identified by traversing starting from east direction, then north-east, later north, and so on and so forth. The neighboring tail entities of 615 are observed to be 12, 24 and 16 corresponding to 612, 624 and 616 respectively. However, it may be observed that the neighboring tail entity 24 corresponding to 624 appears in both south-west direction as well as southern direction of 615. In such cases, the processor 102 may be configured to reflect the neighboring tail entity in the first direction in which it appears while traversing starting from east direction of the head entity 615 i.e., the tail entity 24 may reflect south-west direction and not the south direction, in this example.

If at step 708, the identified entity is not a head entity, then at step 710, the processor may determine whether the identified entity is a tail entity.

If yes, then at step 726, the one or more processors 102 may be configured to identify the presence of a plurality of head entities neighboring the tail entity by traversing in at least eight directions around the tail entity. The eight directions may be east, north-east, north; north-west, west, south-west, south and south-east.

In one embodiment, the one or more processors 102 may be configured to set a threshold for traversing in each direction. As an example, for a tail entity, the threshold may be based on identifying a first head entity in each direction.

At step 728, the one or more processors 102 may be configured to check whether any of the plurality of head entities neighboring the tail entity is identified in multiple directions.

If no, then at step 730, the processor 102 may reflect in the neighborhood vector, the direction of the identified head entity in the neighborhood and the identity of the corresponding head entity.

If yes, then at step 732, the processor 102 may reflect in the neighborhood vector, the direction having the highest priority for the neighboring head entity and the identity of the corresponding head entity.

In one embodiment, the one or more processors 102, while generating a neighborhood vector, may encode the directions in which the neighboring entities are not found with zero.

In one embodiment, the one or more processors 102 may be configured to consider the position between the immediate neighboring entities in a relative difference format. The relative difference format may consider attributes that may include the position of each of the entities in x-direction and y-direction within the page, height of each of the entities, width of each of the entities and aspect ratio of the immediate neighbors. The one or more processors 102 may be configured to concatenate the various attributes and reflect the same in the neighborhood vector 402 corresponding to each neighboring entity.

Referring to FIG. 6, the page 600 that may include head entities with identities 3, 5, 7, 9, 11, 13, 15, 20 and 21 and tail entities with identities 4, 6, 8, 10, 12, 16, 17, 19, 22 and 24.

Applying the step 714 of FIG. 7B, the one or more processors 102 may be configured to generate a neighborhood vector for each of the head entities 3, 5, 7, 9, 11, 13, 15, 20 and 21.

Figure 8:
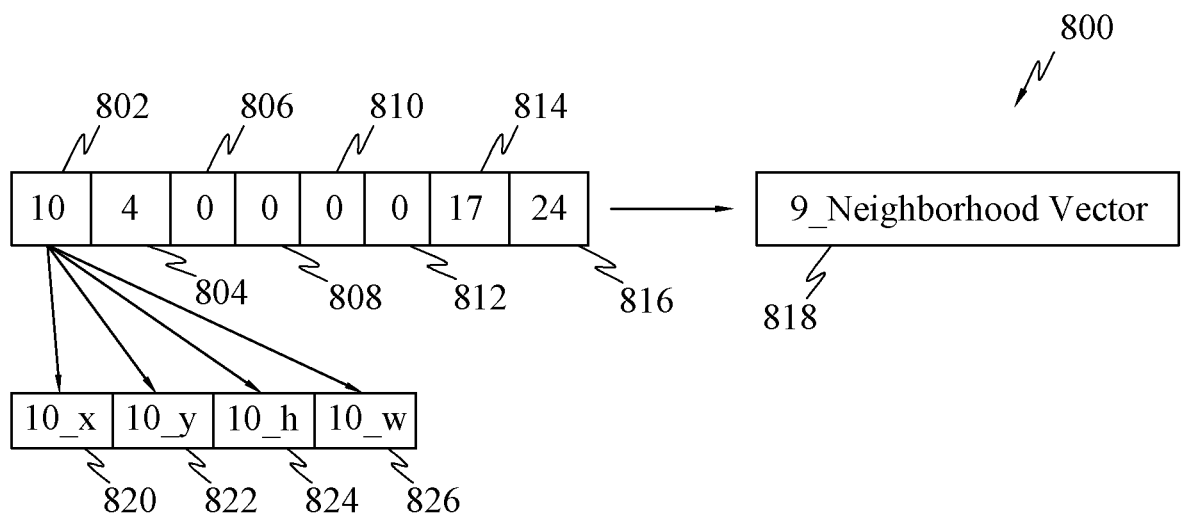
FIG. 8 illustrates a neighborhood vector 800 of an entity.

FIG. 8 illustrates a neighborhood vector 800 of an entity. Referring to FIG. 8, each of the field (802, 804, 806, 808, 810, 812, 814 and 816) in the neighborhood vector 818 may represent one among the eight directions. As an example, 802 may represent east, 804 may represent north-east so on and so forth. The neighborhood vector 818 of the head entity 9 may include the tail entities 10, 4, 17 and 24 reflecting their respective directions as shown in 802, 804, 814 and 816 respectively.

In an embodiment, the position of each of the tail entities 802, 804, 814 and 816 in the neighborhood of the head entity 9 may be determined by concatenating the location of each of the tail entity within the page in x-direction, y-direction, height of each of the tail entities and width of each of the tail entities. For example, position of the tail entity 10 in the neighborhood of the head entity 9 may be determined by concatenating the location of the tail entity 10 in x-direction corresponding to $10\_x$, the location of the tail entity 10 in y-direction corresponding to $10\_y$, height of the tail entity corresponding to $10\_h$ and width of the tail entity corresponding to $10\_w$ as shown in 820, 822, 824 and 826 respectively.

Figure 9:
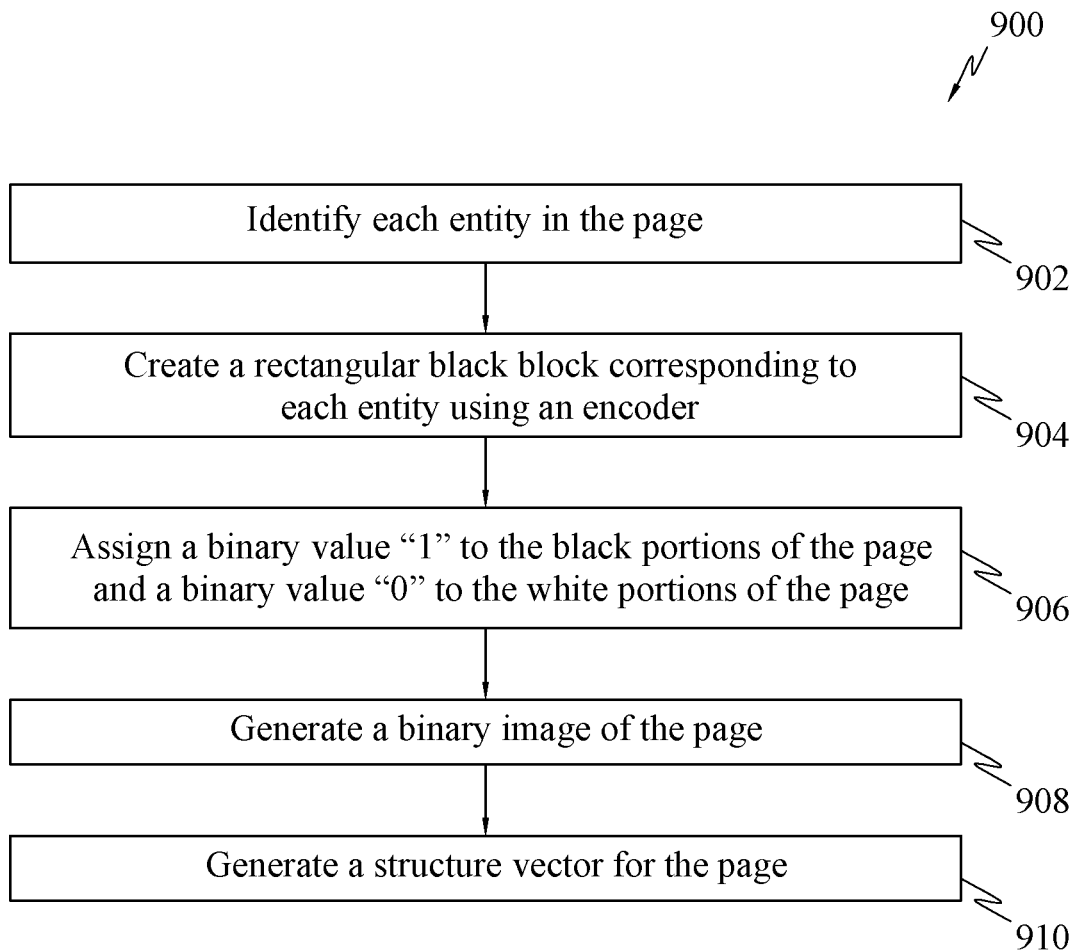
FIG. 9 is a flowchart 900 of a method for generating a structure vector of a page.

FIG. 9 is a flowchart 900 of a method for generating a structure vector of a page.

At step 902, the one or more processors 102 may be configured to identify each of the entities in the page. An information data of the page may be identified in the form of image pixels.

In one embodiment, since data in the form of image pixels may be enormous, the one or more processors 102 may be configured to perform lossy compression to compress the data using encoders at a higher bit rate thereby reducing the storage space required for storing the compressed data of the page. The encoders may comprise any one of variational auto-encoders or wavelets.

At step 904, the encoders may be used to create a rectangular black block corresponding to each entity in the page.

At step 906, the one or more processors 102 may be configured to assign a binary value "1" to the black portions of the page and a binary value "0" to the white portions of the page.

At step 908, the one or more processors 102 may be configured to generate a binary image of the page. The binary image may be configured to comprise each of the entities as rectangular black blocks. Further, the binary image may be configured to reflect the identity of each of the entities of the page for each of the rectangular black blocks.

Figure 10:
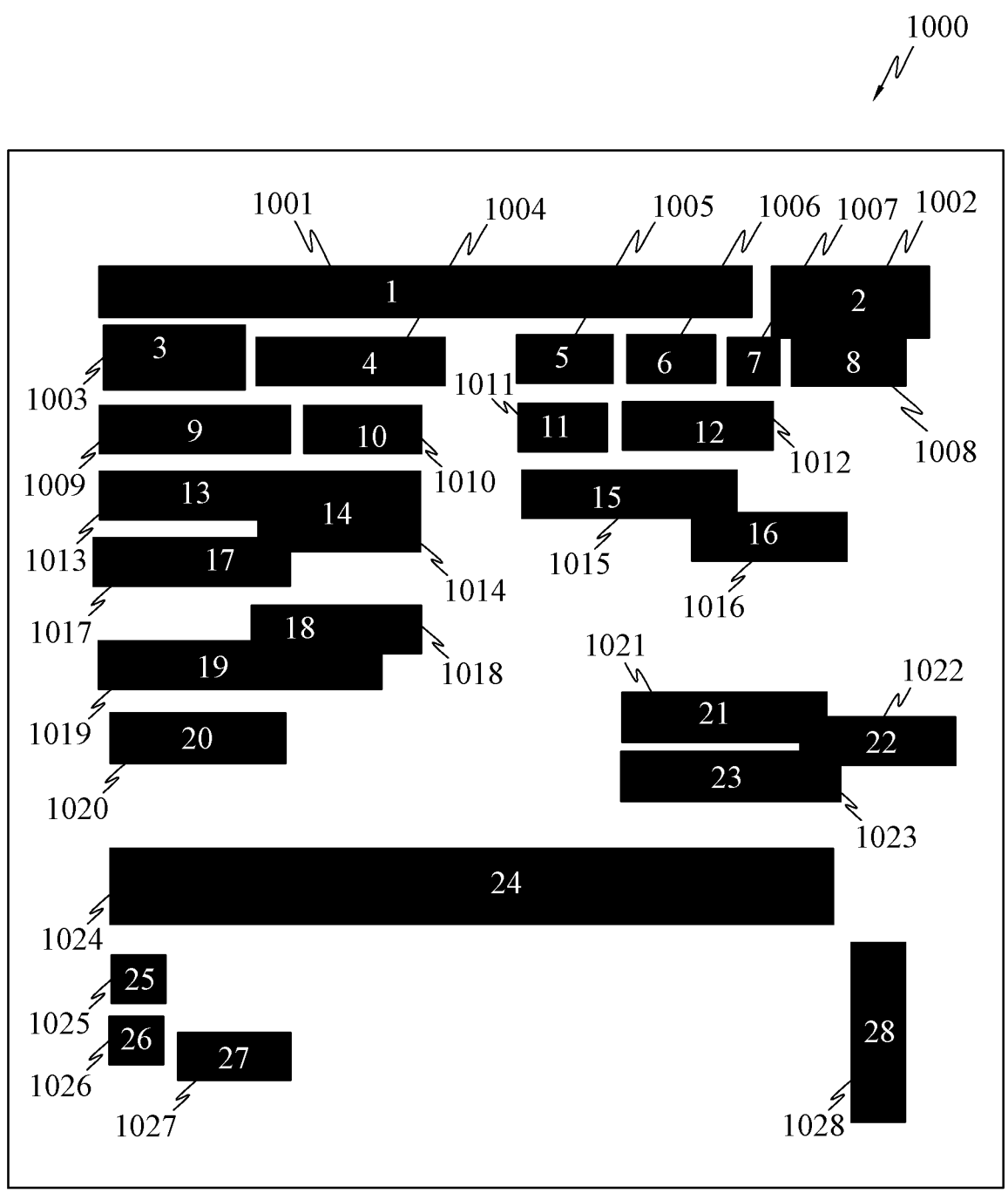
FIG. 10 is an illustration of an example depicting the structure of the page 1000.

Referring to FIG. 10, the rectangular black blocks may reflect the entities 1001 to 1028 with their corresponding identities 1 to 28.

At step 910, the one or more processors 102 may be configured to generate a structure vector 404 for the page reflecting the corresponding binary image of the page.

A structure vector may be unique to a page of particular type. Each type of the page comprises a unique structure wherein the entities are disposed on the page in a specific sequence. The learning module may be provided a training data comprising binary images of different types of pages to learn the disposition of entities on the different types of pages. As an example, a learning module may recognize a passport application form based on the disposition of entities on the binary image of the passport application form. The learning module may be configured to recognize the structure of the passport application form comprising a sequence of evenly distributed spaces at the beginning of a page corresponding to the identity details of an individual, followed by large space corresponding to the address details at the bottom of the page. Similarly, the learning module may recognize a grocery receipt based on the disposition of entities on the binary image of the grocery receipt. The learning module may be configured to recognize the structure of a grocery receipt comprising, a large space at the beginning of the page corresponding to the name and address of the seller, followed by evenly distributed spaces for the list of items and their corresponding prices. The learning module 114 may be configured to differentiate a passport application form from a grocery receipt based on the structure of the passport application form and the structure of the grocery receipt. Upon determination of the type of the page (as an example, either a passport or a grocery receipt), the learning module may generate a structure vector for the page.

In an embodiment, the learning module 114 may be configured to generate a structure vector 404 for a number of types of pages being processed by entity linking system. The types of pages may refer to different types of document like passport, driving license so on and so forth.

Figure 17:
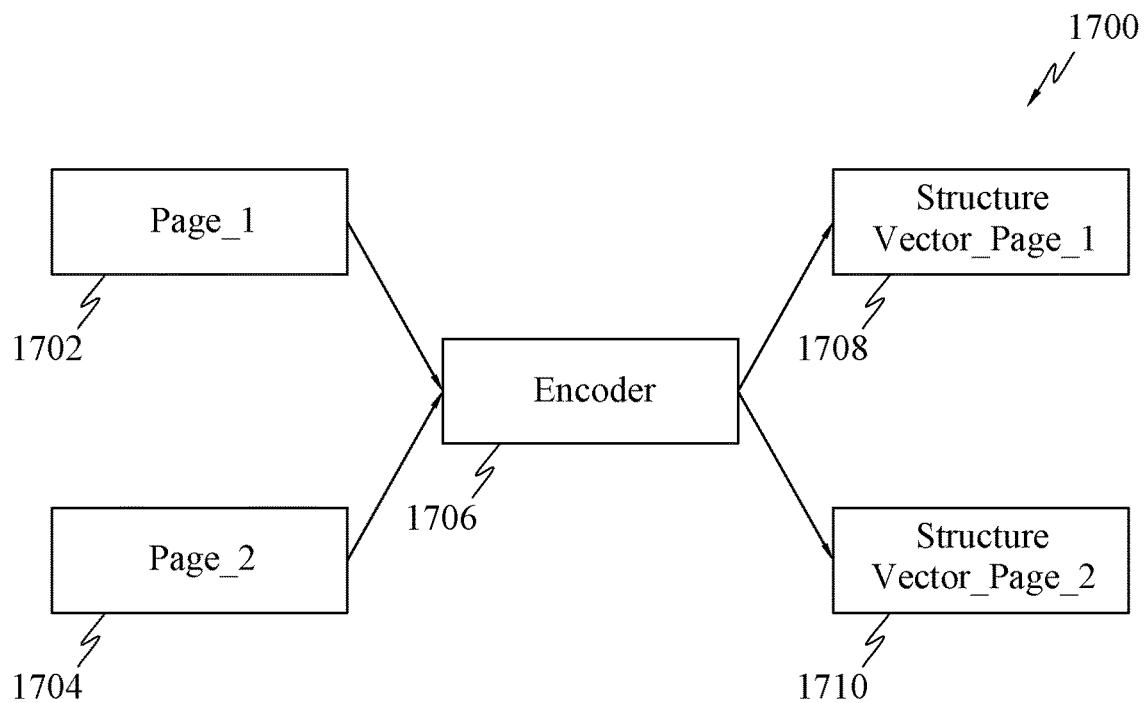
FIG. 17 is an example for training the learning module to generate structure vector for different types of pages.

Referring to FIG. 17, two types of the pages (1702 and 1704) are considered for training the learning module 114. Further, an encoder may be configured to encode each of the pages to generate a structure vector (1708 and 1710) for each of the pages (1702 and 1704). An encoder may be auto-encoders or wavelets for converting the binary image of the page into the structure vector.

In one embodiment, the structure vector for each of the pages (1702 and 1704) may be a one element vector.

In one embodiment, the number of elements in the structure vector may be based on the number of types of pages.

In one embodiment, the number of elements in the structure vector may be equal to log_2 (number of types of pages). As an example, if the number of types of pages is two, the structure vector of each of the pages may comprise one element. Similarly, if the number of types of pages is four, the structure vector of each of the pages may comprise two elements.

Thus, the learning module 114 may be trained using training data to determine the type of page and one or more processor may generate a structure vector for the page.

In an embodiment, the system after determining the type of the page, for a head entity, may assign a weightage to a particular direction among eight directions comprising a tail entity that may be linked with the head entity. As an example, if the system determines the type of page as a driving license, the system may assign a weightage to the east direction of the head entity that relates to the name of license holder.

Figure 11:
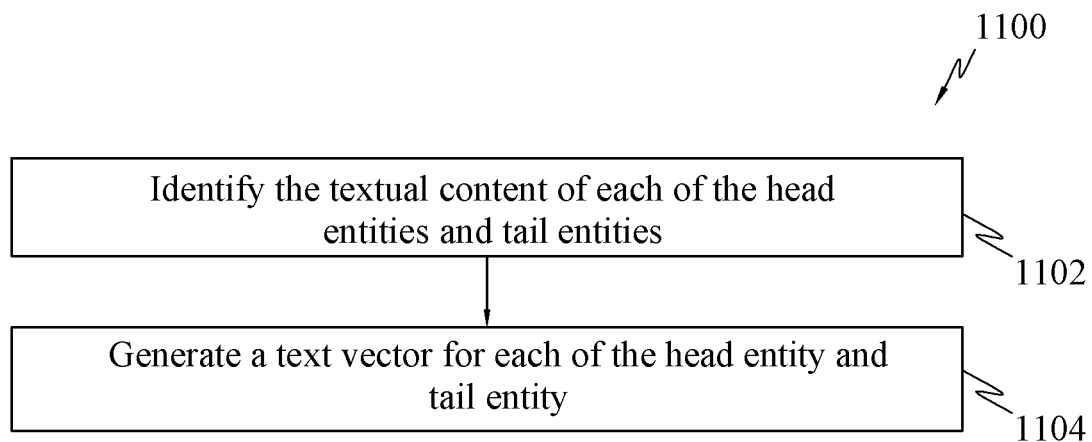
FIG. 11 is a flowchart 1100 of a method of generating a text vector for an entity.

FIG. 11 is a flowchart 1100 of a method of generating a text vector 408 for an entity (head entity or tail entity). At step 1102, the one or more processors 102 may be configured to identify the textual content of the entity (head entity or tail entity).

At step 1104, the one or more processors 102 may be configured to generate a text vector 408 for each of the entity (head entity or tail entity), based on the textual content of each the entities.

Figure 18:
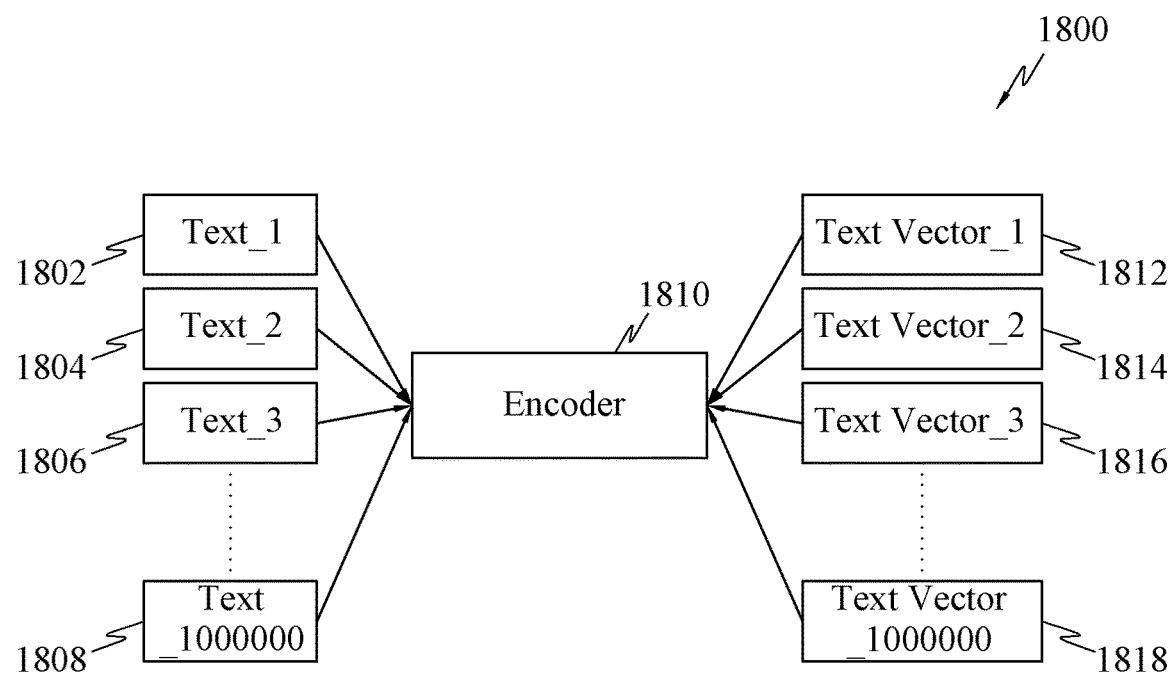
FIG. 18 is an example for training the learning module to generate text vector using a training data set comprising one million different words.

In one embodiment, the learning module 114 may be trained using a training data set comprising words to determine a text vector 408 for an entity. Referring to FIG. 18, the training data set may comprise one million different words (1802, 1804 and so on). A text vector may be generated for each of the words in the training data set. Therefore, in this case, one million text vectors may be generated. An encoder may be used to generate the text vector for each of the words, wherein the encoder may be based on byte pair encoding or word piece encoding. Since the number of words is huge. The encoder 1810 may determine the number of elements in the text vector based on the number of different words.

In one embodiment, the number of elements in the text vector may be equal to log_2 (number of different words). As an example, if the number of different words is one million, the text vector for each of the text may comprise 20 elements.

In an embodiment, the system may generate a text vector 408 for an entity that is within a page that is input, based on the training of the learning module 114.

Figure 12:
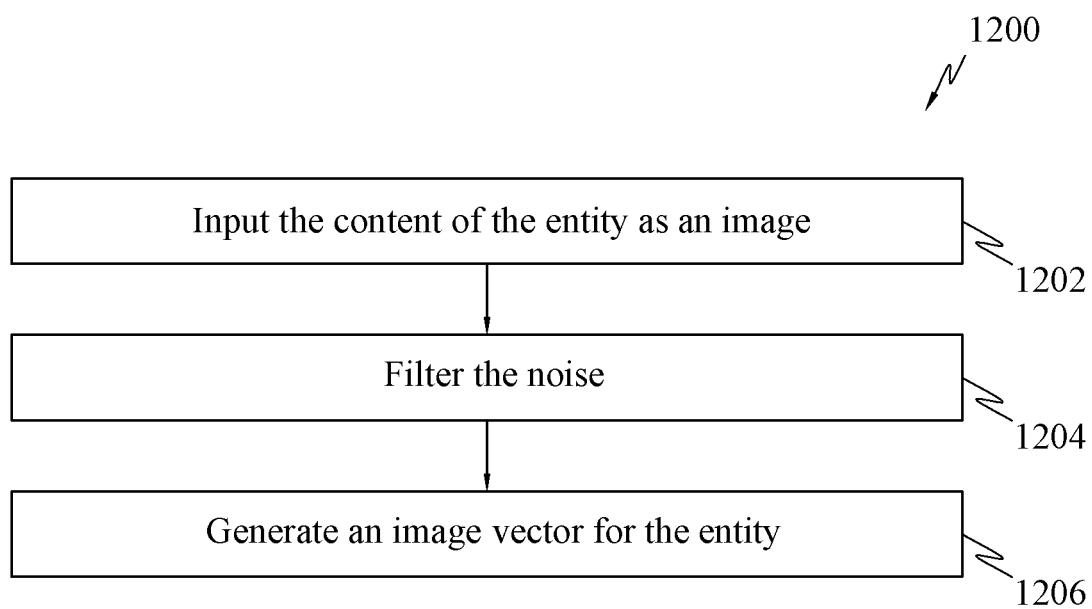
FIG. 12 is a flowchart 1200 of a method of generating an image vector for an entity.

FIG. 12 is a flowchart 1200 of a method of generating an image vector 410 for an entity (head entity or tail entity). At step 1202, an image of each of the head entity and tail entity may be input into the system 100. Each of the image may contain image data in the form of pixels with raw gray values along with random noise.

At step 1204, the one or more processors 102 may use convolution kernels to filter the random noise from the image of each entity.

At step 1206, the one or more processors 102 may be configured to generate an image vector 410 for each filtered image of each of the entities (head entity or tail entity).

Figure 19:
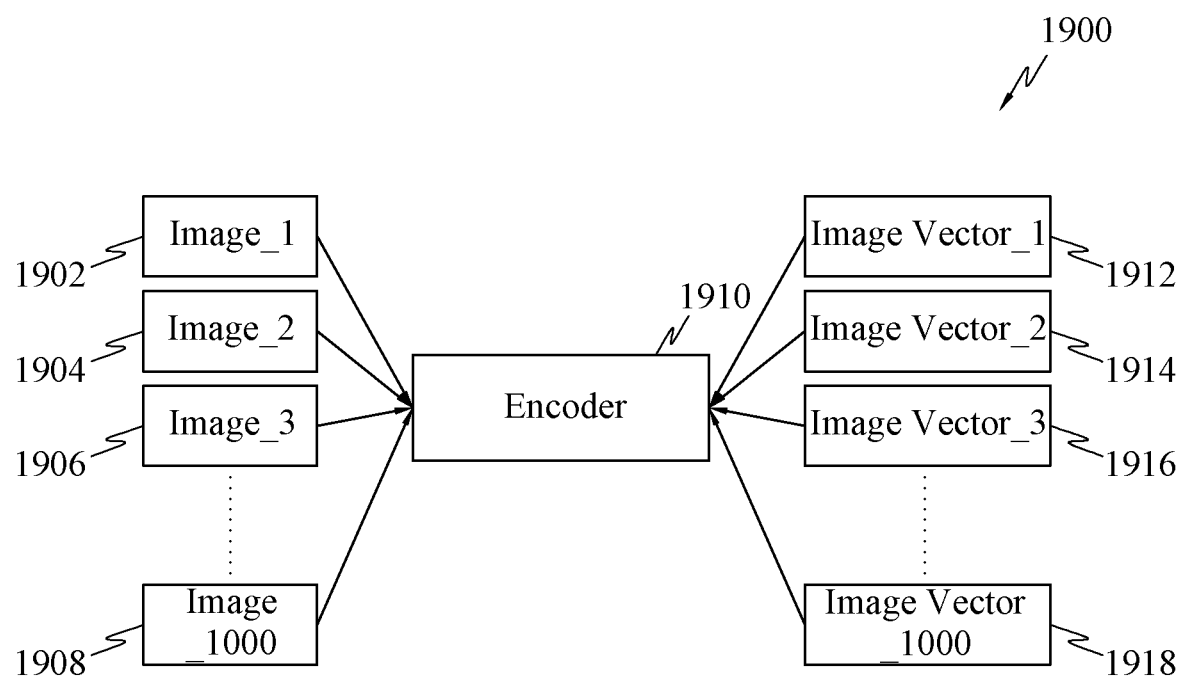
FIG. 19 is example for training the learning module to generate image vector using a training data set comprising one thousand different images.

In one embodiment, the learning module 114 may be trained using a training data set comprising images to determine an image vector 410 for an entity. Referring to FIG. 19, the training data set may comprise thousand variations of images (1902, 1904 and so on). An image vector may be generated for each of the images in the training data set. Therefore, in this case, one thousand image vectors may be generated. An encoder may be used to generate the image vector for each of the images, wherein the encoder may be based on wavelets encoding or RCNN encoding. The encoder 1910 may determine the number of elements in the image vector based on the number of variations of training images.

In one embodiment, the number of elements in the image vector 410 may be equal to log_2 (number of variations of images). As an example, if the number of variation of images is one thousand, the image vector 410 for each of the image may comprise 10 elements.

In an embodiment, the system may generate an image vector for an entity that is within a page that is input, based on the training of the learning module 114.

Figure 13:
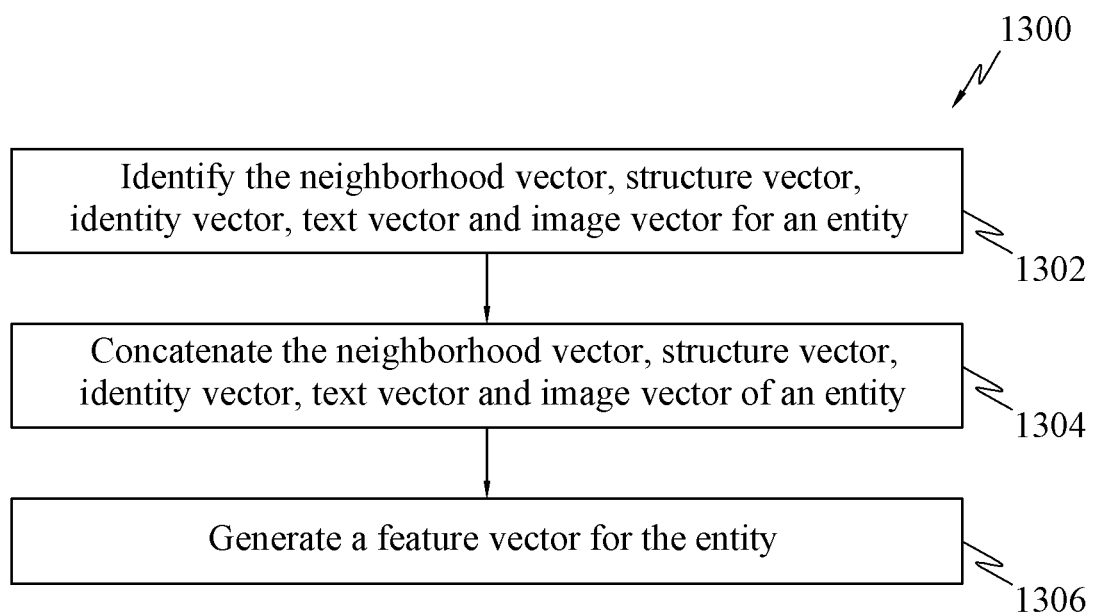
FIG. 13 is a flowchart 1300 of a method of generating a feature vector for an entity.

FIG. 13 is a flowchart 1300 of a method of generating a feature vector for an entity (head entity or tail entity). At step 1302, the one or more processors 102 may be configured to identify the neighborhood vector 402, the structure vector 404, the identity vector 406, the text vector 408 and the image vector 410 corresponding to an entity (head entity or tail entity).

At step 1304, the one or more processors 102 may be configured to concatenate the neighborhood vector 402, the structure vector 404, the identity vector 406, the text vector 408 and the image vector 410 corresponding to the entity (head entity or tail entity).

At step 1306, the one or more processors 102 may generate the feature vector 412 for the entity (head entity or tail entity).

Figure 14:
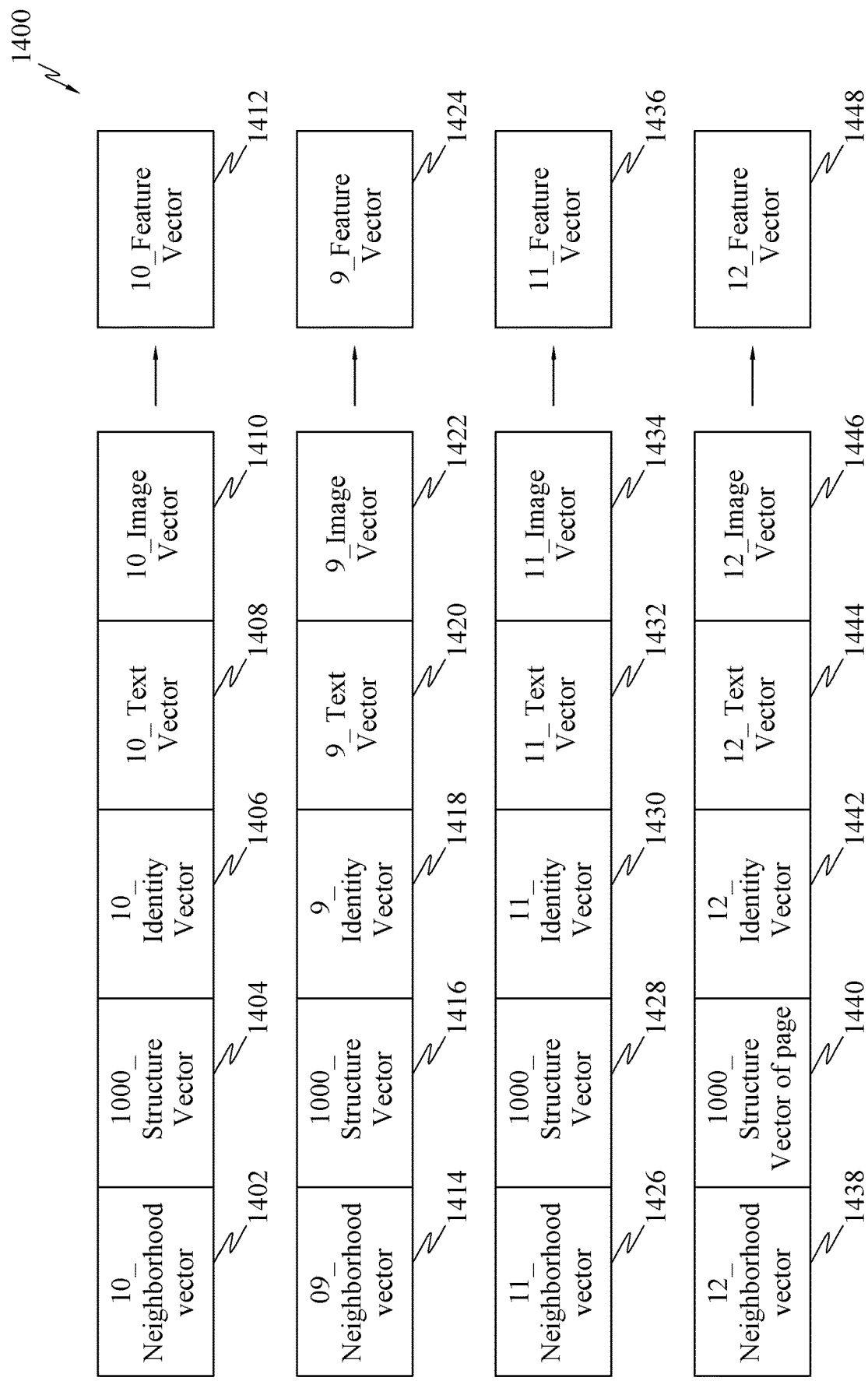
FIG. 14 is an example representing the feature vectors of multiple entities.

FIG. 14 illustrates feature vectors 1412, 1424, 1436 and 1448 for the entities 610, 609, 611 and 612 with identities 10, 9, 11 and 12, respectively. For example, the feature vector 1412 may be formed by concatenating the neighborhood vector 1402, the structure vector 1404, the identity 1406, the text vector 1408 and the image vector 1410 of the head entity 610 with the identity 10.

It may be noted that the structure vector 404 for all the entities within the page may remain unchanged irrespective of whether the entity may be the head entity or the tail entity. For example, the structure vectors 1404, 1416, 1428 and 1440 corresponding to the feature vectors 1412, 1424, 1436 and 1448 may reflect the structure vector "1000_Structure Vector", that remains the same for all the four entities with identities 10, 9, 11 and 12.

Figure 15:
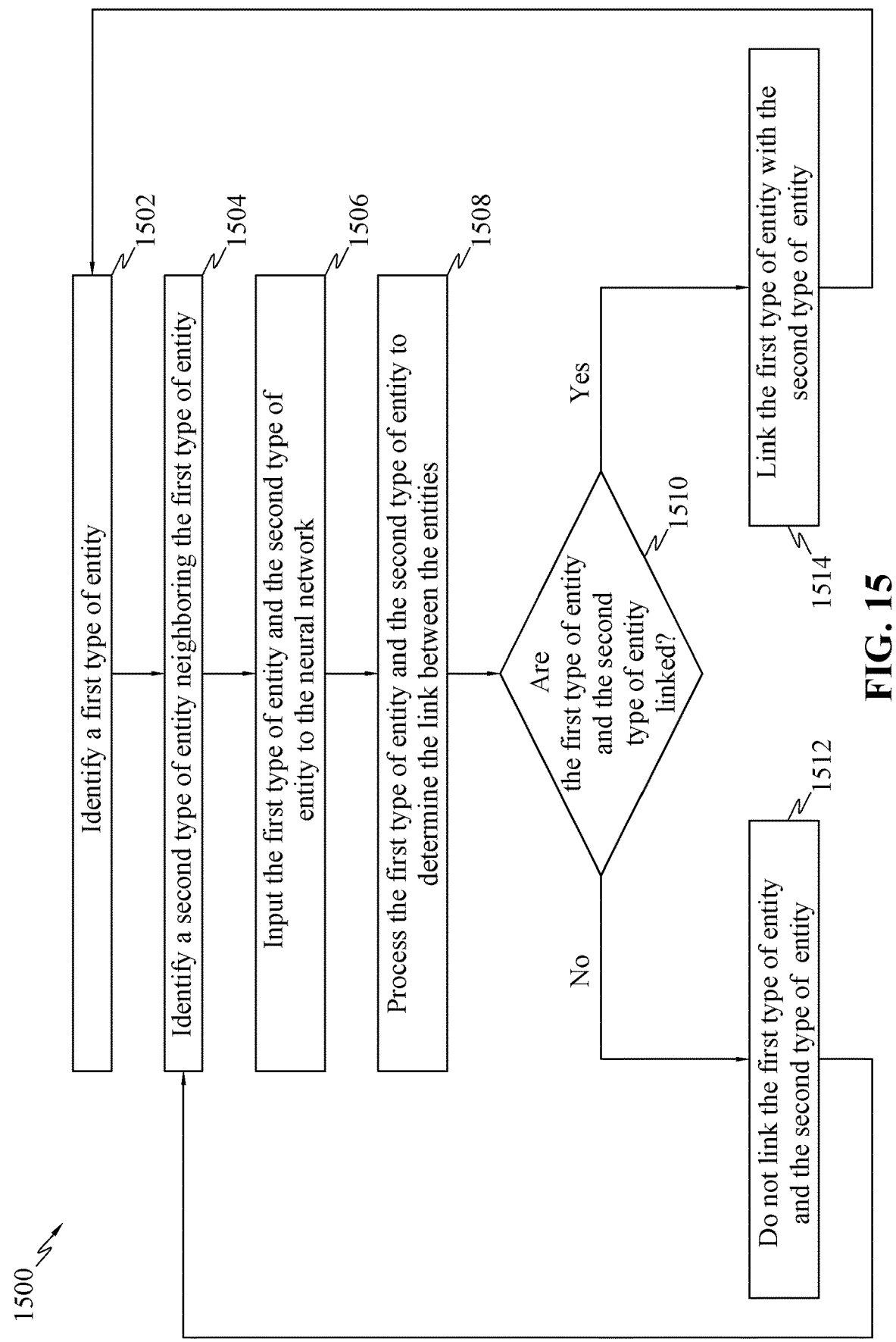
FIG. 15 is a flowchart 1500 of a method of determination of the likelihood of link between a pair of entities.

FIG. 15 is a flowchart 1500 of a method of determination of the likelihood of link between a pair of entities (head entity and tail entity). At step 1502, the one or more processors may identify a head entity.

At step 1504, the one or more processors 102 may be configured to identify a neighboring tail entity corresponding to the head entity.

In one embodiment, the neighboring tail entity may be determined using the feature vector corresponding to the head entity.

At step 1506, the pair of head entity and the neighboring tail entity may be input into the neural network.

At step 1508, the neural network may be configured to process the pair of head entity and the neighboring tail entity.

At step 1510, the neural network may determine whether there exists a link between the identified pair of head entity and the neighboring tail entity or not.

If no, then at step 1512, the neural network may not link the head entity and the neighboring tail entity. Further, at step 1504, the one or more processors may identify another tail entity neighboring the head entity. Further, the neural network may repeat the steps 1506, 1508 and 1510 until a link is established for a neighboring tail entity with the identified head entity.

If there exists a link between the head entity and tail entity at step 1510, then at step 1514, the neural network may link the head entity and the neighboring tail entity.

Further, the one or more processor may identify another head entity, as shown in step 1502 and repeat all the steps till 1514, thereby linking every head entity of the page to its corresponding tail entity.

Figure 16:
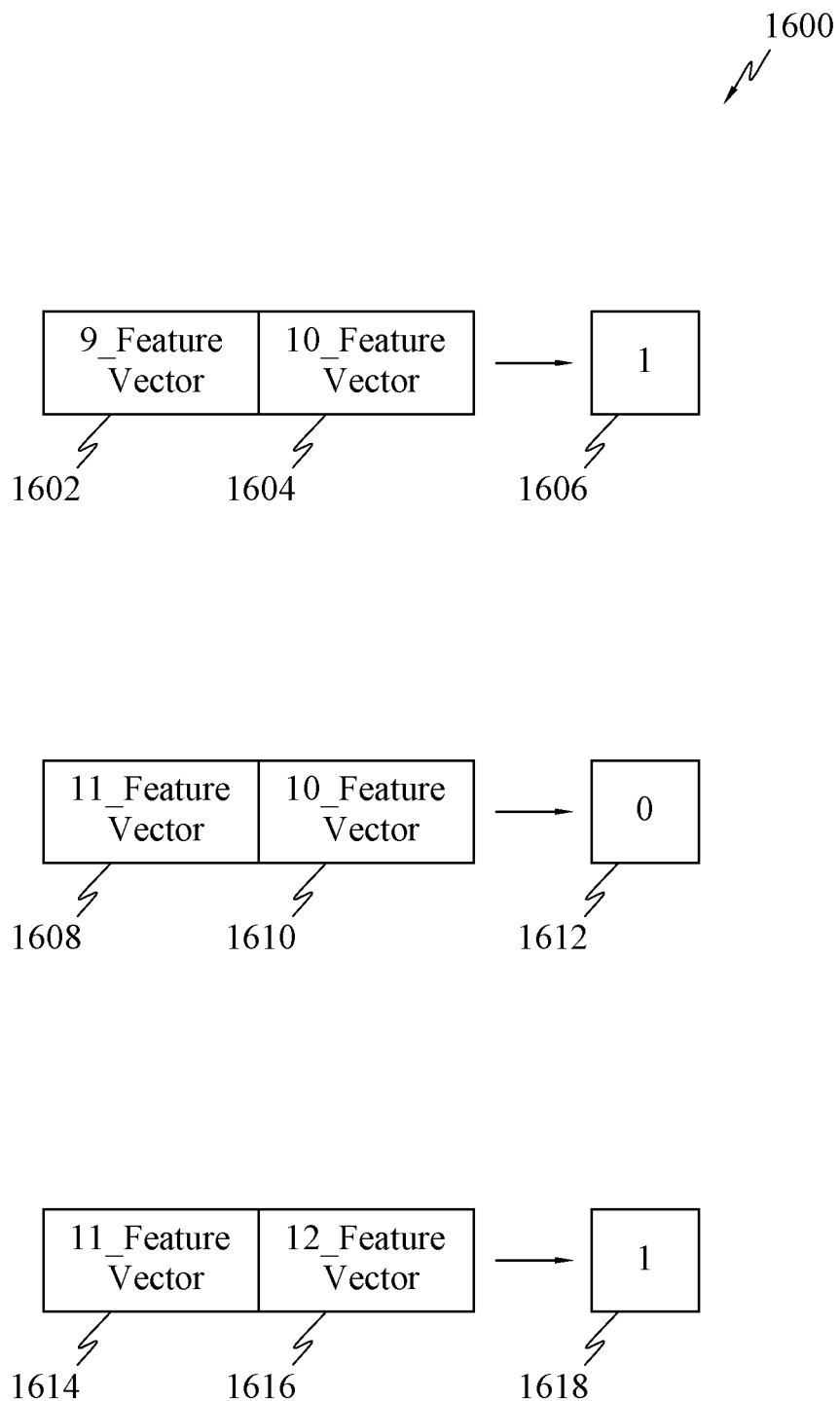
FIG. 16 is an example indicating the link between the feature vectors of each of the pairs of entities.

FIG. 16 is an example indicating the link between the feature vectors of each of the pairs of entities. FIG. 16, illustrates the neural network outputs 1606, 1612 and 1618 for the pairs of entities 9-10, 11-10 and 11-12. The neural network may output a value "1", as indicated in 1606 for feature vectors 1602 and 1604 of the entities 9 and 10, respectively. This reflects that the head entity 9 is linked to the tail entity 10. Similarly, the neural network may output a value "1", as indicated in 1618 for feature vectors 1614 and 1616 of the entities 11 and 12, respectively. This reflects that the head entity 11 is linked to the tail entity 12. However, it may be observed that the neural network may output a value "0" as indicated in 1612 for feature vectors 1608 and 1610 of the entities 10 and 11, respectively. This reflects that, although the tail entity 10 is neighboring to the head entity 11, the head entity 11 may not be linked to the tail entity 10, thereby ensuring each tail entity may be uniquely linked to each head entity.

The entity linking system may be essentially used in handling documents such as application form, a grocery receipt, a shopping bill or an invoice of a purchased product that do not fall into the category of general type of documents such as news articles and published research papers. The documents such as the application form, the grocery receipt, the shopping bill or the invoice of a purchased product may contain a set of core entities that may be related based on the relevance of the document. The determination of the link between the entities enables the computer to process thousands documents at a shorter period by plotting an approximate summary of each type of document based on the relation between their respective entities.

The various embodiments have been described using detailed descriptions that are provided by way of example and are not intended to limit the scope of the invention. The described embodiments comprise different features, not all of which are required in all embodiments. Some embodiments utilize only some of the features or possible combinations of the features. Many other ramification and variations are possible within the teaching of the embodiments comprising different combinations of features noted in the described embodiments.

It will be appreciated by persons skilled in the art that the various embodiments are not limited by what has been particularly shown and described herein above. Rather the scope of the invention is defined by the claims that follow.

What is claimed is:

1. A system for linking entities of a first type and entities of a second type, comprised in a page, the system comprising one or more processors configured to:
    generate a feature vector for each of the entities of the first type and the second type;
    generate a neighborhood vector for each of the entities, wherein,
        the neighborhood vector for each of the entities of the first type is generated by:
            identifying presence of entities of the second type in its neighborhood; and reflecting, in the neighborhood vector, direction in the neighborhood and identity, of the identified entities of the second type in its neighborhood;

the neighborhood vector for each of the entities of the second type is generated by:

identifying presence of entities of the first type in its neighborhood; and reflecting, in the neighborhood vector, direction in the neighborhood and identity, of the identified entities of the first type in its neighborhood;

the feature vector of each of the entities comprises the respective neighborhood vector; and the one or more processors are configured to traverse in at least eight directions from the entity whose neighborhood vector is being generated to identify the neighboring entities;

receive into a neural network, a pair of the feature vectors, the pair comprising the feature vector of one of the entities of the first type and the feature vector of one of the entities of the second type, wherein the entities of the pair are neighboring each other; and generate an output, based on the neural network, indicating the likelihood of the pair of entities being linked.

2. The system as claimed in claim 1, wherein the one or more processors are configured to generate a plot summary of the page based on the output generated.

3. The system as claimed in claim 1, wherein the eight directions are east, north-east, north; north-west, west, south-west, south and south-east.

4. The system as claimed in claim 1, wherein the one or more processors are configured to reflect, in the neighborhood vector, each of the neighboring entities only once.

5. The system as claimed in claim 4, wherein the one or more processors are configured to, while generating the neighborhood vector, reflect the direction that has higher priority in case the neighboring entity is found in multiple directions.

6. The system as claimed in claim 1, wherein the one or more processors are configured to generate an identity vector indicating the identity for each of the entities, wherein the identities are sequentially assigned as per the disposition of the entities in the page and a preconfigured order of assignment of the identities.

7. The system as claimed in claim 6, wherein the one or more processors are configured to generate a structure vector for the page, wherein the one or more processors are configured to:

identify each entity in the page;

create a rectangular black block corresponding to each entity using an encoder;

assign binary values to the page, wherein the black portions of the page are assigned a binary value "1"; and the white portions of the page are assigned a binary value "0"; and generate a binary image of the page.

8. The system as claimed in claim 1, wherein the one or more processors are configured to generate an identity vector indicating the identity for each of the entities, wherein the feature vector of each of the entities further comprises the respective identity vector.

9. The system as claimed in claim 1, wherein the one or more processors are configured to generate a structure vector for the page, wherein the structure vector reflects structure of the page, wherein the feature vector of each of the entities further comprises the structure vector.

10. The system as claimed in claim 1, wherein the one or more processors are configured to generate a text vector for each of the entities, wherein the text vector reflects the text in the entity, wherein the feature vector of each of the entities further comprises the respective text vector.

11. The system as claimed in claim 1, wherein the one or more processors are configured to generate an image vector for each of the entities, wherein the image vector is generated by processing an image of the entity, wherein the feature vector of each of the entities further comprises the respective image vector.

12. The system as claimed in claim 11, wherein the one or more processors are configured to generate the feature vector of each entity by concatenating the neighborhood vector, the identity vector, the structure vector, the text vector and the image vector of each entity.

* * * * *